United States Patent
Lim (10) Patent No.: US 11,681,265 B2
(45) Date of Patent: Jun. 20, 2023

(54) GENERATING FACILITY MANAGEMENT DEVICE FOR HIGH TEMPERATURE COMPONENT

(71) Applicant: Jung Sub Lim, Chungcheongnam-do (KR)

(72) Inventor: Jung Sub Lim, Chungcheongnam-do (KR)

(73) Assignee: KOREA WESTERN POWER CO., LTD., Chungcheongnam-do (KR)

( * ) Notice: Subject to any disclaimer, the term of this patent is extended or adjusted under 35 U.S.C. 154(b) by 0 days.

(21) Appl. No.: 16/858,260

(22) Filed: Apr. 24, 2020

(65) Prior Publication Data
US 2021/0116879 A1    Apr. 22, 2021

(30) Foreign Application Priority Data
Oct. 17, 2019   (KR) .................... 10-2019-0129218

(51) Int. Cl.
*G05B 19/042*    (2006.01)

(52) U.S. Cl.
CPC .. *G05B 19/0428* (2013.01); *G05B 2219/2639* (2013.01)

(58) Field of Classification Search
CPC ................. G05B 19/0428; G05B 2219/2639
See application file for complete search history.

(56) References Cited

U.S. PATENT DOCUMENTS

| | | | |
|---|---|---|---|
| 7,571,057 B2 * | 8/2009 | D'Amato | F01D 21/003 415/118 |
| 8,981,967 B1 * | 3/2015 | Shore | B64F 5/00 340/945 |
| 2003/0074163 A1 * | 4/2003 | Anand | G05B 15/02 703/1 |
| 2003/0083827 A1 * | 5/2003 | Chow | F02C 9/52 702/34 |
| 2004/0093102 A1 * | 5/2004 | Liiri | G05B 19/4185 700/96 |
| 2005/0192696 A1 * | 9/2005 | Utaka | G05B 23/0213 700/116 |
| 2006/0116799 A1 * | 6/2006 | Mahlo | B60T 8/172 701/31.4 |
| 2013/0179388 A1 * | 7/2013 | Agarwal | G06Q 10/06 706/47 |
| 2013/0214534 A1 * | 8/2013 | Nakamura | F03D 80/50 290/44 |
| 2013/0253974 A1 * | 9/2013 | Mangalam | G06Q 10/06315 705/7.25 |

(Continued)

FOREIGN PATENT DOCUMENTS

KR    10-1282244 B1    7/2013
KR    10-1329395 B1    11/2013

*Primary Examiner* — Ronald D Hartman, Jr.
(74) *Attorney, Agent, or Firm* — Reinhart Boerner Van Deuren P.C.

(57) ABSTRACT

Disclosed is a generating facility management device capable of automatically calculating and determining inspection intervals of generating facilities using a system. In an example embodiment, the generating facility management device calculates inspection intervals of unit devices constituting each of the generating facilities using a time code index, a stressor index and a degradation mechanism index.

9 Claims, 7 Drawing Sheets

(56) References Cited

U.S. PATENT DOCUMENTS

| | | | |
|---|---|---|---|
| 2014/0039648 A1* | 2/2014 | Boult | G05B 23/0283 |
| | | | 700/79 |
| 2014/0149159 A1* | 5/2014 | Kioussis | G06Q 10/063 |
| | | | 705/7.11 |
| 2015/0356478 A1* | 12/2015 | Fruchtnicht | G06Q 10/0635 |
| | | | 705/7.28 |
| 2017/0124778 A1* | 5/2017 | Tsuji | B60R 16/0234 |
| 2017/0356945 A1* | 12/2017 | Lee | G01R 29/0871 |
| 2018/0253087 A1* | 9/2018 | Ewens | G06Q 10/20 |

\* cited by examiner

| Indexes associated with Automatic Calculation of Inspection Intervals | Index range | Remarks |
|---|---|---|
| Degradation Mechanism Index | 0 ~ 3 | Quantification of degradation mechanisms |
| Time code Index | 0 ~ 100 | Quantification of time codes |
| Stressor Index | 0 ~ 3 | Quantification of stressors |

FIG. 3A

| Degradation Mechanism | Index | Interval |
|---|---|---|
| Broken | 2 | 6.7 |
| Clogged | 1 | 18.2 |
| Crack | 2 | 6.7 |
| Cutting | 2 | 6.7 |
| Degraded Material | 1 | 18.2 |
| Erosion | 0.5 | 30.0 |
| External Corrosion | 0.5 | 30.0 |
| Housing Damage | 0.5 | 30.0 |
| Leakage | 1.5 | 11.0 |
| Loose | 1.5 | 11.0 |
| Lose of tension | 1 | 18.2 |
| Misalignment | 2.5 | 4.1 |
| Steam cutting | 2 | 6.7 |
| Steam passing | 1.5 | 11.0 |
| Wear | 1 | 18.2 |

| Time Code | Index(Month) | Interval |
|---|---|---|
| Grade0 | Random | |
| Grade1 | 0.25 | 6.7 |
| Grade2 | 0.5 | 13.4 |
| Grade3 | 1 | 26.8 |
| Grade4 | 2 | 53.5 |
| Grade5 | 3 | 80.3 |
| Grade6 | 4 | 107.1 |
| Grade7 | 5 | 133.8 |
| Grade8 | 6 | 160.6 |
| Grade9 | 7 | 187.4 |
| Grade10 | 8 | 214.1 |
| Grade11 | 9 | 240.9 |
| Grade12 | 10 | 267.7 |
| Grade13 | 11 | 294.4 |
| Grade14 | 12 | 321.2 |

| Stressors | Index | Interval |
|---|---|---|
| Aging of materials | 1 | 6.7 |
| Contamination | 0.5 | 13.4 |
| High temperaure | 2 | 3.3 |
| High duty cycle | 2 | 3.3 |
| Vibration | 1.5 | 4.5 |
| High vibration | 2 | 3.3 |
| Originally low quailty | 1.5 | 4.5 |
| Fluid Quality | 1.5 | 4.5 |

FIG. 5B

GENERATING FACILITY MANAGEMENT DEVICE FOR HIGH TEMPERATURE COMPONENT

CROSS-REFERENCE TO RELATED APPLICATION

This application claims priority to and the benefit of Korean Patent Application No. 10-2019-0129218 filed on Oct. 17, 2019 in the Korean Intellectual Property Office, the contents of which in its entirety are herein incorporated by reference.

BACKGROUND

1. Field

Aspects of embodiments of the present disclosure relate to a generating facility management device capable of automatically calculating and determining inspection intervals of generating facilities using a system.

2. Description of the Related Art

As the potential degradation risks occurring to long-term operating facilities are on the rise, it is necessary to conduct reinforced ordinary and regular maintenance activities suited to facility characteristics of power plants. To date, however, techniques enabling a timely inspection are not available in the existing maintenance regime, and there is a demand for proper preventive maintenance techniques.

In existing ordinary preventive maintenance schemes, since maintenance has been just habitually performed without objectively analyzing a variety of characteristics of about 30,000 unit devices (1,800 MW; about 2% of the total power capacity on the basis of combined cycle power plants in Korea), maintenance items and intervals of major core devices were frequently omitted or missed, and inspection items or cycles were inadequately determined in some cases, resulting in incidences of stoppage of power generation or reduced power output, which is problematic.

In addition, given that each three minutes per unit device is allocated on the basis of an eight hour operation per day, a considerable time of about 187.5 man-days is required in analyzing about 30,000 unit devices.

SUMMARY

Embodiments of the present disclosure provide a generating facility management device capable of automatically calculating and determining inspection intervals of generating facilities using a system.

According to an aspect of the present disclosure, a generating facility management device for managing operations of generating facilities is provided, the generating facility management device calculating inspection intervals of unit devices constituting the generating facilities using a time code index, a stressor index and a degradation mechanism index.

The generating facility management device may calculate an inspection interval using the following equation (1):

$$\text{Inspection interval} = \frac{TI}{SI \times eDI} \times 197.79 \quad (1)$$

where TI represents a time code index, SI represents a stressor index, and DI represents a degradation mechanism index.

The degradation mechanism index may be defined as a quantified index in consideration of degradation mechanisms occurring due to the generating facility stressors and the effects thereof exerted on power production, and may be set to be in the range of between 0 and 3.

The time code index may be defined as a quantified index of degradation occurrence cycles on a monthly basis.

The stressor index may be defined as a quantified index in consideration of various generating facility stressors and the effect thereof exerted on power production, and the scale of abnormalities occurring to the generating facility according to the generating facility stressors may be in the range of between 0 and 3.

As described above, the generating facility management device according to the present disclosure defines a degradation mechanism index, a time code index and a stressor index for each generating facility and calculates the inspection interval of the generating facility by inputting a corresponding index to a predetermined algorithm.

DETAILED DESCRIPTION

Hereinafter, a preferred embodiment of the present disclosure will be described in detail with reference to the accompanying drawings such that those can easily be embodied by those skilled in the art.

Figure 1:
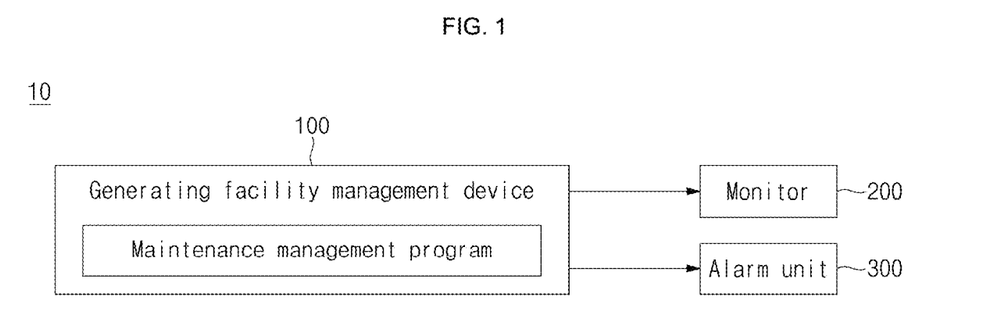
FIG. 1 is a schematic diagram of a generating facility management device according to an embodiment of the present disclosure.
Figure 2:
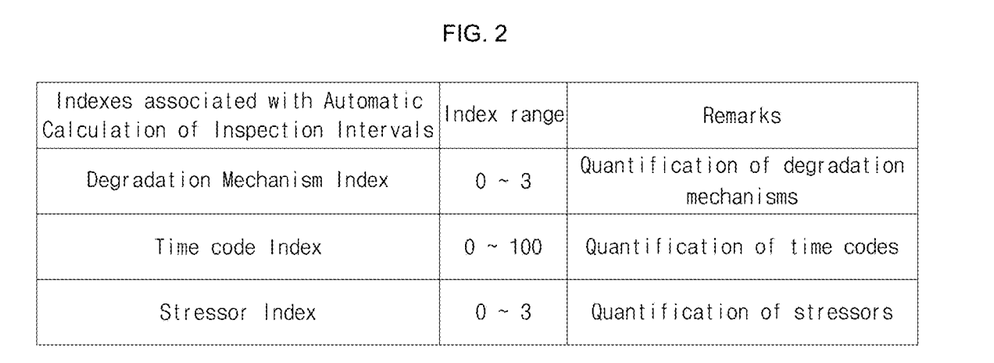
FIG. 2 shows a table that defines various indexes used in the generating facility management device according to an embodiment of the present disclosure.

FIG. 1 is a schematic diagram of a generating facility management device according to an embodiment of the present disclosure. FIG. 2 shows a table that defines various indexes used in calculating a degree of significance for each unit device in the generating facility management device according to an embodiment of the present disclosure.

Referring to FIG. 1, a generating facility 10 according to an embodiment of the present disclosure may include a monitor 200 and an alarm unit 300, which are connected to a generating facility management device 100.

The generating facility management device 100 may include a maintenance management program embedded therein and may automatically calculate and obtain inspection intervals of a generating facility by inputting various indexes for the respective unit devices constituting the generating facility according to the result of the program into an inspection interval calculation algorithm.

To this end, as shown in FIG. 2, the generating facility management device 10 may store a degradation mechanism index, a time code index and a stressor index. Here, the degradation mechanism index means indexes obtained by quantifying various faults, i.e., degradation mechanism, the time code index means indexes obtained by quantifying degradation occurrence cycles, and the stressor index means indexes obtained by quantifying various stressors causing degradation to the generating facility.

The respective indexes will now be defined in detail.

(1) Degradation Mechanism Index (DI)

The degradation mechanism index (DI) is defined as a index quantified in consideration of degradation mechanisms occurring due to the generating facility stressors and the effects thereof exerted on power production.

The scale of abnormalities occurring to the generating facility is quantified in the range of between 0 and 3 according to the degradation mechanism.

(2) Time Code Index (TI)

The time code index (TI) is defined as an index of degradation occurrence cycles quantified on a monthly basis (e.g., 0.25→7.5 days, 0.5→15 days, 1→30 days, etc.)

(3) Stressor Index (SI)

The stressor index (SI) is defined as a quantified index in consideration of generating facility stressors and the effects thereof exerted on power production.

The scale of abnormalities occurring to the generating facility is quantified in the range of between 0 and 3 according to the generating facility stressor.

Meanwhile, there is rising awareness of necessity of quantifying the cycles of degradation occurring to the generating facility according to the degradation mechanism and stressor. A function for automatically calculating inspection intervals, as used in the embodiment of the present disclosure, is an algorithm derived by analyzing maintenance experiences and correlations between actual degradation mechanisms and each of various indexes, including the degradation mechanism index, the time code index, and the stressor index. Results values of the algorithm are calculated on a daily basis by inputting the indexes to the algorithm, thereby automatically calculating the inspection interval.

Generally, degradation occurrence cycles may be empirically determined according to the actually occurring degradation mechanism. However, selecting the degradation occurrence cycles according to the degradation mechanism and stressor may become a key factor in preventing facility degradation. As the degradation mechanism and stressor effects exerted on the stability of the generating facility become severer, the facility needs to be maintained in a shorter inspection interval.

In particular, as the stressor and the degradation mechanism become more harsh, the facility degradation tends to exponentially increase in proportion to the stressor and the degradation mechanism, respectively. Therefore, the stressor and degradation mechanism effects need to be reflected in determining the inspection interval.

Specifically, in order to calculate the quantitative values obtained by the diagnosis function on a daily basis, the inventors of the present application derived a constant 197.79 through a simulation for calculating actual inspection intervals and on-the-spot verification, and the obtained constant is reflected on the function to thus deduce the following diagnosis equation:

$$\text{Inspection interval} = \frac{TI}{SI \times eDI} \times 197.79 \quad \text{(Equation 1)}$$

where TI represents a time code index, SI represents a stressor index, and DI represents a degradation mechanism index.

In the equation 1 provided above, the inspection interval may be calculated on a daily basis.

Hereinafter, the inspection interval of the generating facility management device for a gas turbine high-temperature component according to an embodiment of the present disclosure will be described by way of example.

Figure 3A:
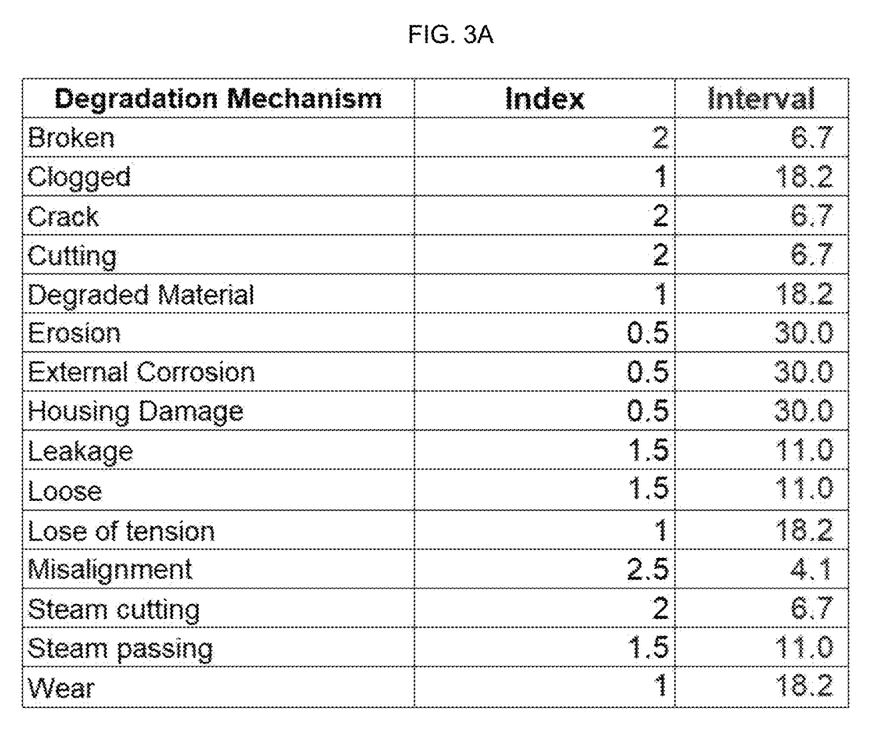
FIGS. 3A and 3B show degradation mechanism index-dependent inspection intervals.
Figure 3B:
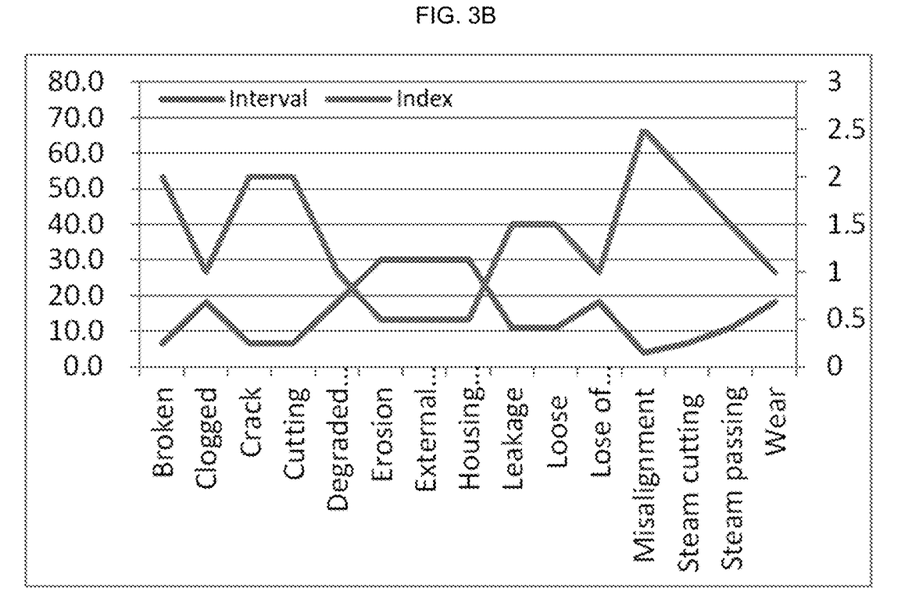
Figure 4A:
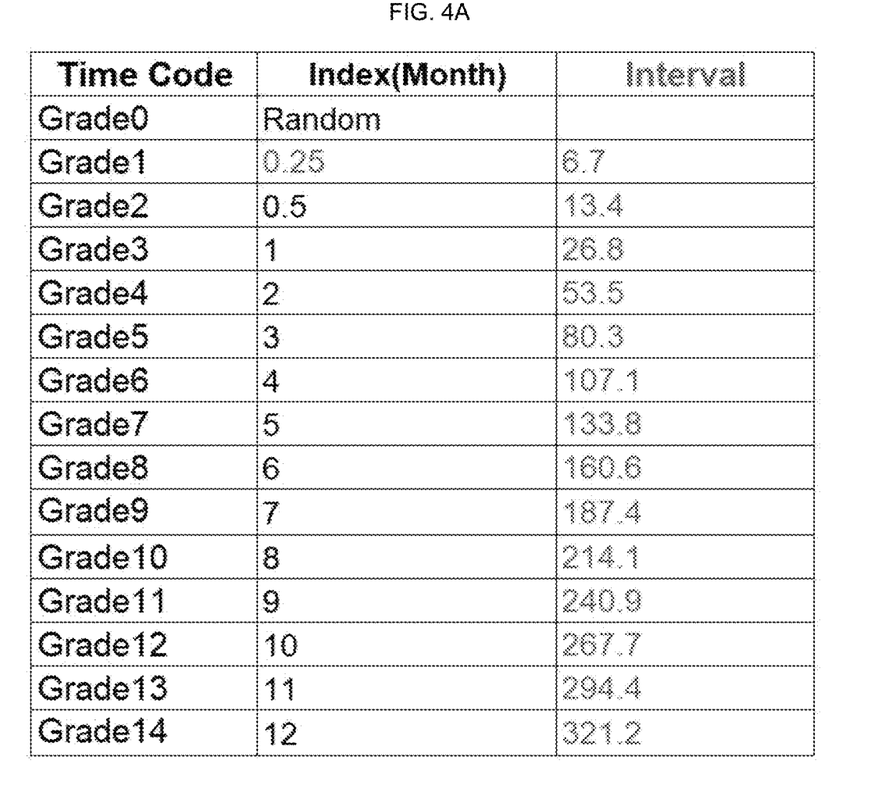
FIGS. 4A and 4B show time code index-dependent inspection intervals.
Figure 4B:
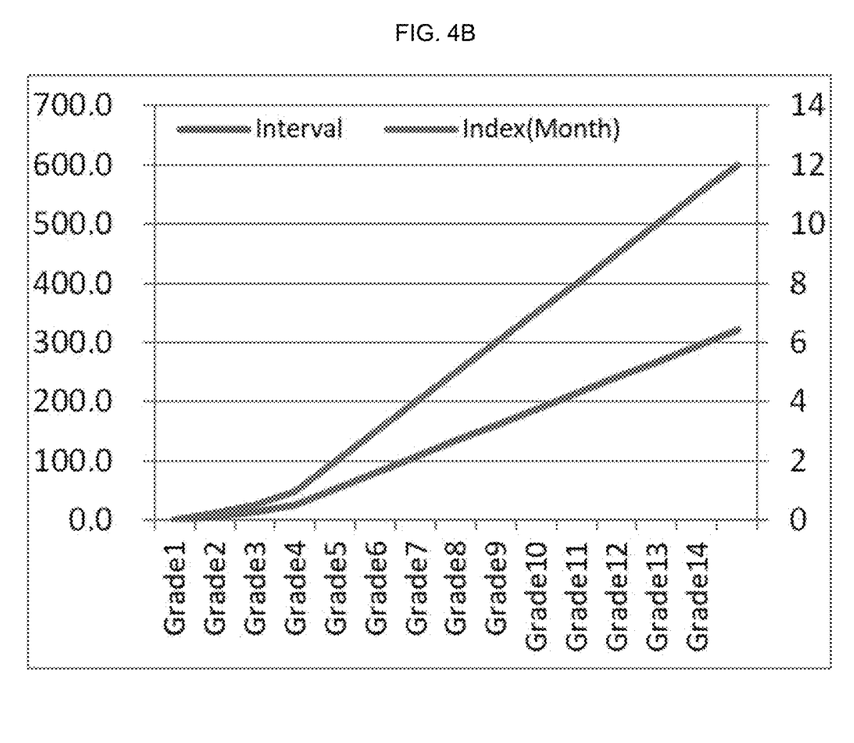
Figure 5A:
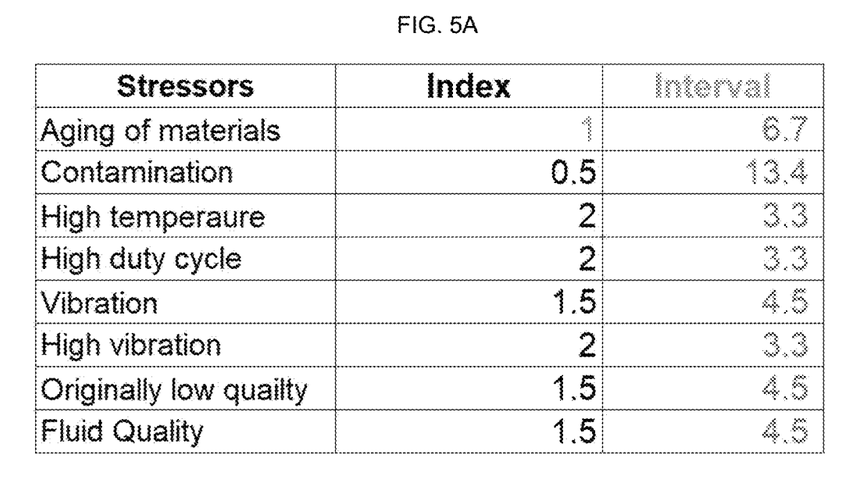
FIGS. 5A and 5B show stressor index-dependent inspection intervals.
Figure 5B:
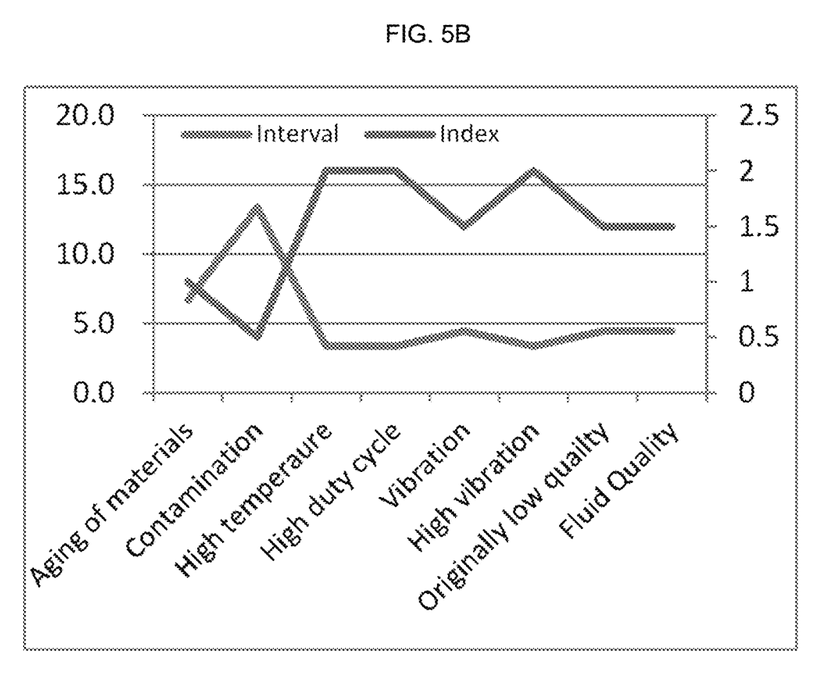

FIGS. 3A and 3B show degradation mechanism index-dependent inspection intervals. FIGS. 4A and 4B show time code index-dependent inspection intervals. FIGS. 5A and 5B show stressor index-dependent inspection intervals.

First, referring to FIGS. 3A and 3B, in cases when the time code index (TI) and the stressor index (SI) are fixed to 0.25 and 1, respectively, inspection intervals for various degradation mechanisms including, for example, broken, are shown.

As an example, in the case of broken degradation, the degradation mechanism index may be assigned 2, and the inspection interval can be finally calculated to yield 6.7 using the assigned index value. As another example, in the case of housing damage, the degradation mechanism index may be assigned 0.5, and the inspection interval can be finally calculated using the assigned index value to yield 30.0 using the assigned index value.

Next, referring to FIGS. 4A and 4B, in cases when the degradation mechanism index (DI) and the stressor index (SI) are fixed to 2 and 1, respectively, the time code index for Grade 1 may be assigned 0.25, and the inspection interval can be finally calculated to yield 6.7 using the assigned index value.

In addition, referring to FIGS. 5A and 5B, in cases when the degradation mechanism index (DI) and the time code index (TI) are fixed to 2 and 0.25, respectively, the stressor index (SI) for aging of materials may be assigned 1, and the inspection interval can be finally calculated to yield 6.7 using the assigned value. As another example, in the case of high temperature stressor, the stressor index (SI) may be assigned 2, and the inspection interval can be finally calculated using the assigned index value to yield 3.3 using the assigned index value.

While the foregoing embodiment has been described to practice the generating facility management device for a high temperature component of the present disclosure, it will be understood by those of ordinary skill in the art that various changes in form and details may be made therein without departing from the spirit and scope of the present disclosure as defined by the following claims.

What is claimed is:

1. A generating facility management device for managing operations of generating facilities, the generating facility management device calculating inspection intervals of unit devices constituting the generating facilities using a time code index, a stressor index and a degradation mechanism index, wherein the generating facility management device calculates an inspection interval using the following equation:

$$\text{Inspection interval} = \frac{TI}{SI \times eDI} \times 197.79 \quad (1)$$

where TI represents a time code index, SI represents a stressor index, and DI represents a degradation mechanism index.

2. The generating facility management device of claim 1, wherein the degradation mechanism index is defined as a quantified index in consideration of degradation mechanisms occurring due to the generating facility stressors and the effects thereof exerted on power production, and is set to be in the range of between 0 and 3.

3. The generating facility management device of claim 1, wherein the time code index is defined as a quantified index of degradation occurrence cycles on a monthly basis.

4. The generating facility management device of claim 1, wherein the stressor index is defined as a quantified index in consideration of various generating facility stressors and the effect thereof exerted on power production, and the scale of abnormalities occurring to the generating facility according to the generating facility stressors is in the range of between 0 and 3.

5. A method of managing operations of generating facilities using a facility management device, the method comprising:
    calculating, by the facility management device, inspection intervals of unit devices constituting the generating facilities using a time code index, a stressor index and a degradation mechanism index;
    wherein calculating is performed using the following equation:

$$\text{Inspection interval} = TI/SI \times eDI \times 197.79 \qquad (1)$$

where TI represents a time code index, SI represents a stressor index, and DI represents a degradation mechanism index.

6. A method of managing operations of generating facilities using a facility management device, the method comprising:
    calculating, by the facility management device, inspection intervals of unit devices constituting the generating facilities using a time code index, a stressor index and a degradation mechanism index;
    wherein the degradation mechanism index is defined as a quantified index in consideration of degradation mechanisms occurring due to the generating facility stressors and the effects thereof exerted on power production, and is set to be in a range of between 0 and 3.

7. A method of managing operations of generating facilities using a facility management device, the method comprising:
    calculating, by the facility management device, inspection intervals of unit devices constituting the generating facilities using a time code index, a stressor index and a degradation mechanism index;
    wherein the stressor index is defined as a quantified index in consideration of various generating facility stressors and the effect thereof exerted on power production, and a scale of abnormalities occurring to the generating facility according to the generating facility stressors is in a range of between 0 and 3.

8. A generating facility management device for managing operations of generating facilities, the generating facility management device calculating inspection intervals of unit devices constituting the generating facilities using a time code index, a stressor index and a degradation mechanism index, and wherein the degradation mechanism index is defined as a quantified index in consideration of degradation mechanisms occurring due to the generating facility stressors and the effects thereof exerted on power production, and is set to be in a range of between 0 and 3.

9. A generating facility management device for managing operations of generating facilities, the generating facility management device calculating inspection intervals of unit devices constituting the generating facilities using a time code index, a stressor index and a degradation mechanism index, and wherein the stressor index is defined as a quantified index in consideration of various generating facility stressors and the effect thereof exerted on power production, and a scale of abnormalities occurring to the generating facility according to the generating facility stressors is in a range of between 0 and 3.

\* \* \* \* \*

UNITED STATES PATENT AND TRADEMARK OFFICE
CERTIFICATE OF CORRECTION

PATENT NO. : 11,681,265 B2
APPLICATION NO. : 16/858260
DATED : June 20, 2023
INVENTOR(S) : Jung Sub Lim Page 1 of 1

It is certified that error appears in the above-identified patent and that said Letters Patent is hereby corrected as shown below:

In the Claims

Column 5, Line 24 Claim 5, the equation on Line 10 reads, "Inspection interval=TI/SI×eDI×197.79 (1)" and should read -- $Inspection\ interval = \frac{TI}{SI \times eDI} \times 197.79 \ ... \ (1)$ --

Signed and Sealed this
Eighth Day of August, 2023

Katherine Kelly Vidal
*Director of the United States Patent and Trademark Office*